United States Patent
Hays

[11] Patent Number: 6,163,380
[45] Date of Patent: Dec. 19, 2000

[54] OFF-AXIS COUPLED ETALON INTERFEROMETERS

[75] Inventor: Paul B. Hays, Ann Arbor, Mich.

[73] Assignee: Hays, Fisk, Moors, LLC, Ann Arbor, Mich.

[21] Appl. No.: 09/456,122

[22] Filed: Dec. 7, 1999

Related U.S. Application Data

[60] Provisional application No. 60/115,691, Jan. 13, 1999.

[51] Int. Cl.$^7$ ...................................................... G01B 9/02
[52] U.S. Cl. .............................................................. 356/519
[58] Field of Search ...................................... 356/352, 346

[56] References Cited

U.S. PATENT DOCUMENTS

| | | | |
|---|---|---|---|
| 4,558,952 | 12/1985 | Ulrich et al. | 356/352 |
| 5,116,133 | 5/1992 | Sweeney | 356/352 |
| 5,666,195 | 9/1997 | Shultz et al. | 356/352 |

*Primary Examiner*—Samuel A. Turner
*Attorney, Agent, or Firm*—Gifford, Krass, Groh, Sprinkle, Anderson & Citkowski, PC

[57] ABSTRACT

Methods and apparatus are employed to enhance the efficiency and applicability of Fabry-Perot interferometers. In existing devices, light introduced at a first off-axis point on the image plane is partially transmitted through the interferometer to the detector and partially reflected to a second off-axis point on the image plane. Broadly, the invention re-uses the light reflected to the second off-axis point rather than discarding it. As one example, the reflected light is guided to a third off-axis point on the image plane for retransmission back through the interferometer to a different point on the detector. A plurality of optical fibers are employed, each having one end to receive light at an off-axis point of the image plane, and another end to re-direct the light back through the etalon from a different off-axis point of the image plane. Alternatively, the reflected light is guided to a second detector, which may, in fact, form a portion of a second interferometer. As a further alternative, a mirror or other reflective element may be used to redirect the light back to the same point on the detector. In each case, the angular coherence of the light is preferably randomized prior to the subsequent detection. A multi-mode optical fiber is preferably used to carry the redirected light, which conveniently acts to randomize the angular coherence of the light during its travel.

30 Claims, 6 Drawing Sheets

OFF-AXIS COUPLED ETALON INTERFEROMETERS

REFERENCE TO RELATED APPLICATIONS

This application claims priority from U.S. provisional patent application Ser. No. 60/115,691, filed Jan. 13, 1999, the entire contents of which are incorporated herein by reference.

FIELD OF THE INVENTION

This invention relates generally to interferometers and, in particular, methods and apparatus for improving the efficiency of the light imaged by a parallel Fabry-Perot etalon.

BACKGROUND OF THE INVENTION

The Fabry-Perot interferometer is a high-throughput device when used for wavelength selection as a simple filter, but exhibits distinct disadvantages when used as a spectrometer. As a filter, the device can transmit a majority of the received light. Typically, more than 50 percent of the collimated incoming light can be transmitted to the next optical element.

However, when a spectrum is created using the angular wavelength selection of the device, a large amount of the incoming light is lost by reflection. This is due to the fact that wavelength selection is accomplished by reflecting the light back out of the system from other parts of the spectrum.

In a broad spectrum, the amount of light transmitted to the detector is given by the expression $$T = \frac{1-R}{1+R}$$

which is the same as a set of two incoherent mirrors of reflectivity R in series. This is a serious problem when the amount of light available is limited by a discrete source. For instance, when R=0.9, which is a typical value for high resolution, the transmitted energy is only 5.3 percent of the energy available. The rest of the light is reflected back out of the system.

U.S. Pat. No. 5,666,195 to Shultz et al, entitled EFFICIENT FIBER COUPLING OF LIGHT TO INTERFEROMETRIC INSTRUMENTATION, recognizes that light recycling may be used in certain cases. More particularly, the '291 patent discloses a method of redirecting light to improve the transmission efficiency of wedged interferometers by positioning optical fibers to direct reflected light into positions enabling iterated transmission of the otherwise wasted light.

The teachings of the '195 patent are strictly limited to wedge-space etalons, or Fizeau etalons, wherein the mirrors internal to the device are not parallel to one another. As discussed in the '195 patent, "for the parallel-mirror etalon . . . the incident light is divergent, so that the reflected light continues to diverge and cannot be further employed. However, the wedged etalon . . . is illuminated with collimated light, so that the reflected light remains collimated but nevertheless also unutilized."

Thus, although Shultz et al. recognized that unused light may be recycled in a wedge-spaced interferometer, they failed to recognize that reflected light be reused in a Fabry-Perot etalon, which is an interferometer of the type having parallel reflective surfaces, as illustrated in FIG. 1A of the '195 patent. The need remains, therefore, for apparatus and methods whereby the efficiency of non-wedged-spaced interferometers may be enhanced by taking advantage of reflected light which would otherwise be wasted.

SUMMARY OF THE INVENTION

This invention resides in methods and apparatus for enhancing the efficiency and applicability of Fabry-Perot interferometers having an image plane and optical detector disposed along an optical axis. In such devices, light introduced at a first off-axis point on the image plane is partially transmitted through the interferometer to the detector and partially reflected to a second off-axis point on the image plane. Broadly, the invention re-uses the light reflected to the second off-axis point rather than discarding it.

According to a preferred embodiment, the reflected light is guided to a third off-axis point on the image plane for retransmission back through the interferometer to a different point on the detector. To further increase sensitivity, a plurality of optical fibers are employed, each having one end to receive light at an off-axis point of the image plane, and another end to re-direct the light back through the etalon from a different off-axis point of the image plane.

According to an alternative embodiment, the reflected light is guided to a second detector, which may form a portion of a second interferometer. As a further alternative, a mirror or other reflective element may be used to redirect the light back to the same point on the detector. In each case, the angular coherence of the light is preferably randomized prior to the subsequent detection. A multi-mode optical fiber is preferably used to carry the redirected light, which conveniently acts to randomize the angular coherence of the light while being re-routed.

DETAILED DESCRIPTION OF THE INVENTION

This invention resides in methods and apparatus for enhancing the efficiency and utility of Fabry-Perot interferometers. Broadly, and in general terms, the invention recognizes at least two techniques for improving upon existing configurations. According to a first approach, rejected light is reflected into a separate interferometer, detector, or other apparatus operative to observe a desired spectrum as a compliment to the transmitted spectrum. According to an alternative approach, reflected light is returned back into and through the same etalon in a different region of solid angle so as to increase the signal on the primary detector.

These two techniques are not equal in their potential for increasing the signal to the detector. The first option can, in theory, increase the signal by a factor of two, but often does not achieve that improvement since there is usually a large background signal that produces noise on the secondary detector. The second technique has the potential to produce an enhancement that will cause the energy transmitted to the detector to be equal to that of the incoming light. However, for the recycled light technique it is important the most angular coherence of the returned light be lost.

The following description considers these two techniques, and specific approaches for achieving the potential gains are identified. A discussion is also presented which examines the use of fiber optics in general to couple multiple-element interferometers.

COMPLEMENTARY DETECTOR TECHNIQUES

Figure 1:
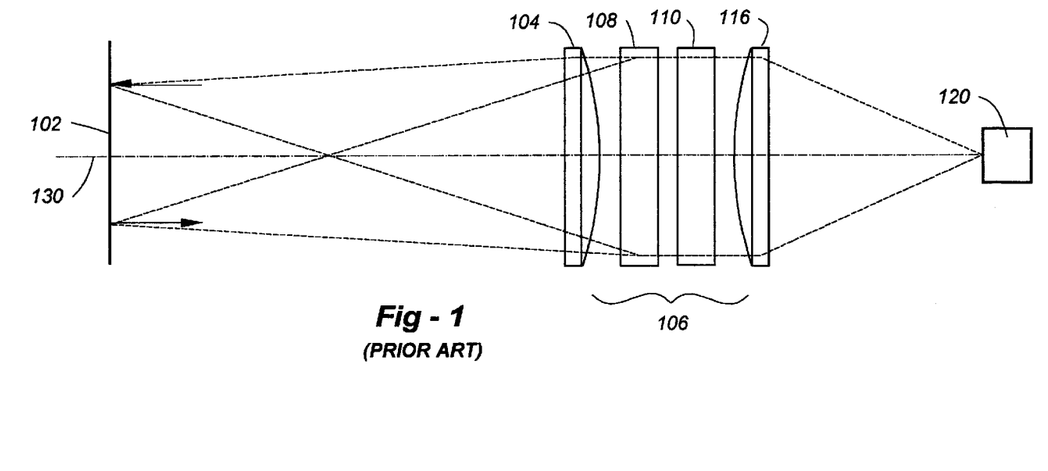
FIG. 1 is a drawing which shows how light is reflected from a Fabry-Perot etalon on the opposite side of the optical axis, as in the case of a conventional mirror.

FIG. 1 illustrates a prior-art interferometer wherein light received at an image plane 102 is collimated by an objective 104 and passed through a Fabry-Perot etalon 106 which includes partially reflecting parallel mirrors 108 and 110. The portion of the light transmitted through the etalon 106 is focused by element 112 onto a detector 120.

Figure 2:
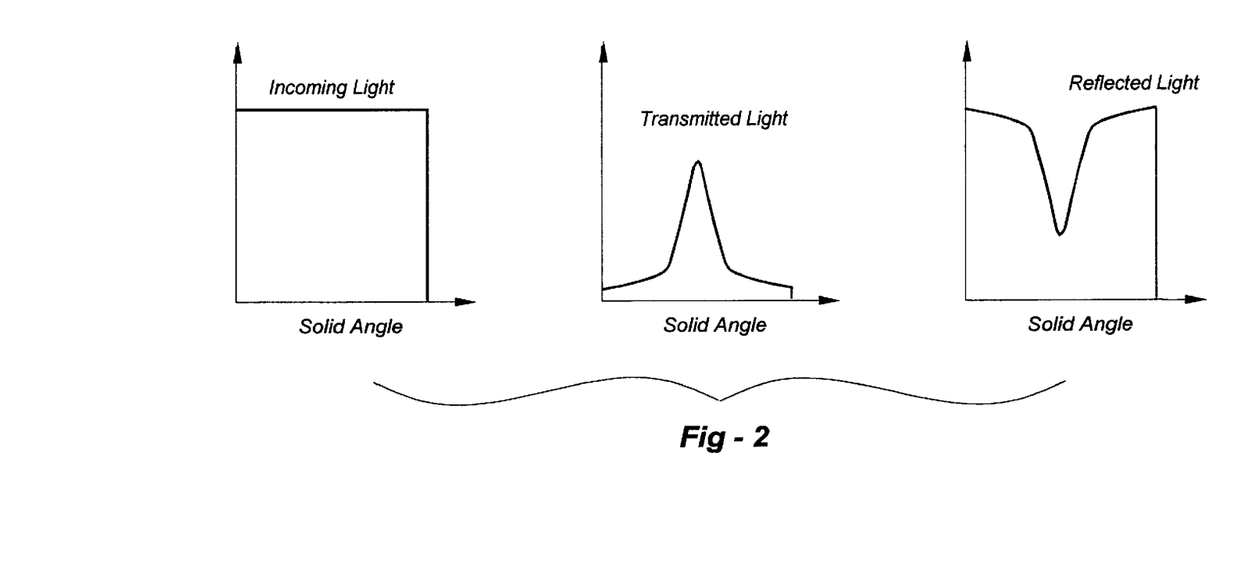
FIG. 2 is an illustration of the incoming light from a monochromatic source, the transmitted angular spectrum, and the reflected angular spectrum, wherein, in each case, brightness is plotted as a function of solid angle.

The light reflected from the etalon 106 appears on the opposite side of the optical axis 130 of the system at point 132, as it would with a conventional mirror. An illustration of the incoming light from a monochromatic source, the transmitted angular spectrum, and the reflected angular spectrum is shown in FIG. 2.

Figure 3:
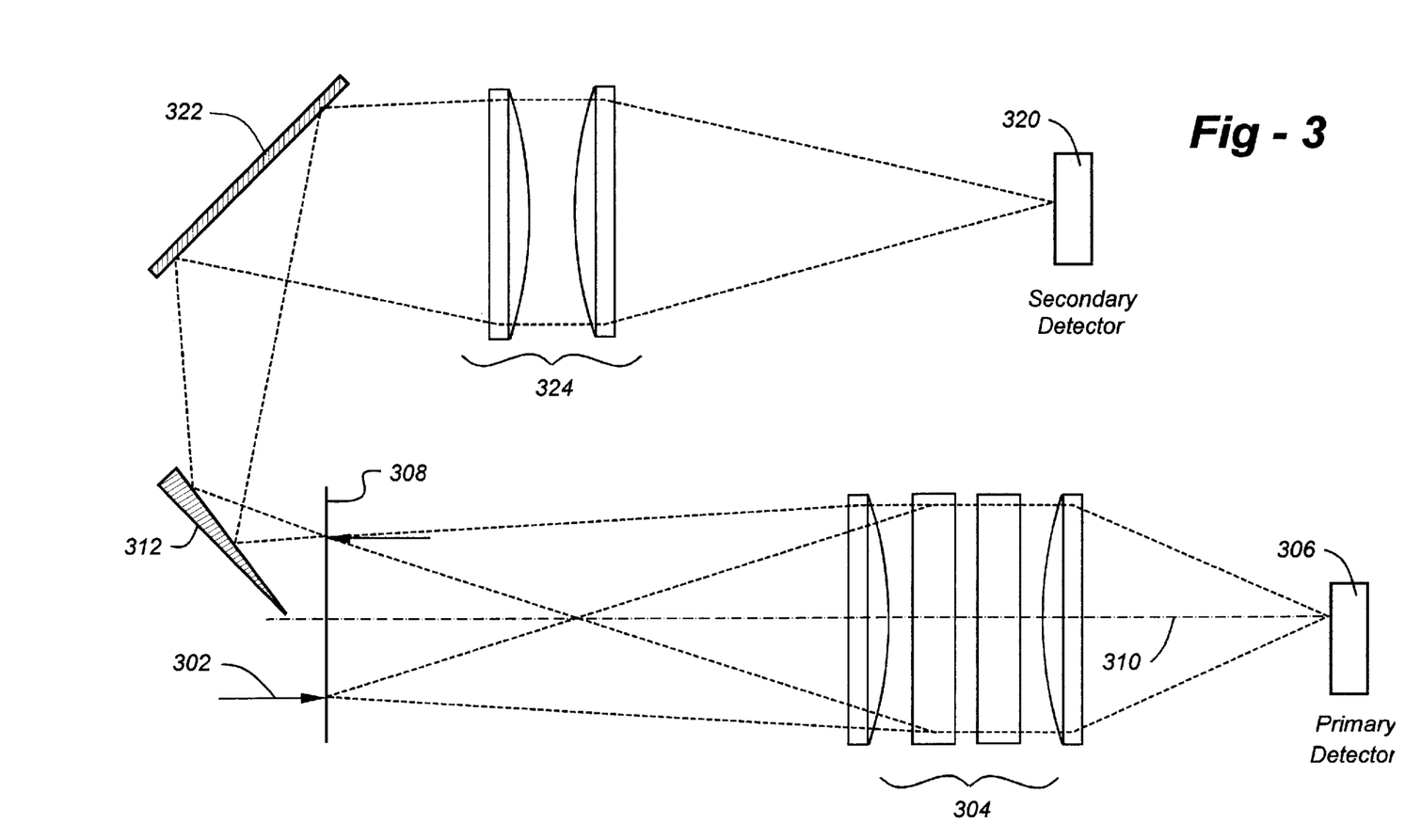
FIG. 3 illustrates a first embodiment of the invention wherein light reflected by a Fabry-Perot interferometer is routed to a secondary detector.

One way to utilize the reflected light according to the invention is to channel the light to a second complementary detector. A schematic representation of an instrument used to detect the reflected light spectrum is shown in FIG. 3. In this particular embodiment, a portion of the incoming light 302 is transmitted through the etalon 304 and received at a primary detector 306. A significant amount of the light is reflected to point 308 on the opposite side of the optical axis 310. According to this embodiment of the invention, the reflected light is gathered and redirected by a knife-edge mirror 312 or other suitable redirecting device, passed to the secondary detector 320. Other optical elements may be added, as appropriate, including other reflective surfaces 322 and collimating/focusing optics 324.

A significant signal gain is achieved when the complementary spectrum of reflected light is sampled by the secondary light detector 320. Since the integral of the reflected light is significantly larger than that transmitted (in fact, the ratio is for monochromatic light, or $2R/(1-R)$) a large improvement may indeed be recognized.

The detection scheme depicted in FIG. 3 will produce a signal gain somewhat less than a factor of two, but this represents a very desirable enhancement for a Fabry-Perot interferometer. It should be noted that in this type of beam-splitting scheme the primary and secondary ring patterns are usually only half of the ring. This is not a disadvantage if the detector can observe a number of orders outside of the central fringe. A number of alternative schemes are possible for achieving the goal of adding a reflected light detector. For example, in polarized light a polarizing beam splitter may be used to maintain a full ring pattern on the secondary detector.

An alternative to using a secondary detector is to reflect the light into a second interferometer that has quite different spectral properties so that the two ring patterns are not the same. This is useful when two distinct spectral signatures are present in the spectrum. The application is when a very narrow laser line is scattered by aerosols or molecules. In this case the aerosol return is very narrow, identical to the laser itself, and the molecular return is thermally broadened.

The detection of these two signals requires etalons with greatly divergent spectral properties, the aerosol signal is best observed using a very high resolution etalon of large gap, while the molecular signal is best viewed with a resolution matching the thermal width of the molecular line. These two interferometers have very different fringe patterns, the aerosol being composed of very closely spaced rings in angular space, and the molecular having much larger rings. In this case it is possible to take the light reflected from the aerosol interferometer and view it in the molecular interferometer without great difficulty. The resulting ring pattern in the molecular interferometer is a series of large rings crossed by a set of very fine dark rings created by the aerosol channel.

Figure 4:
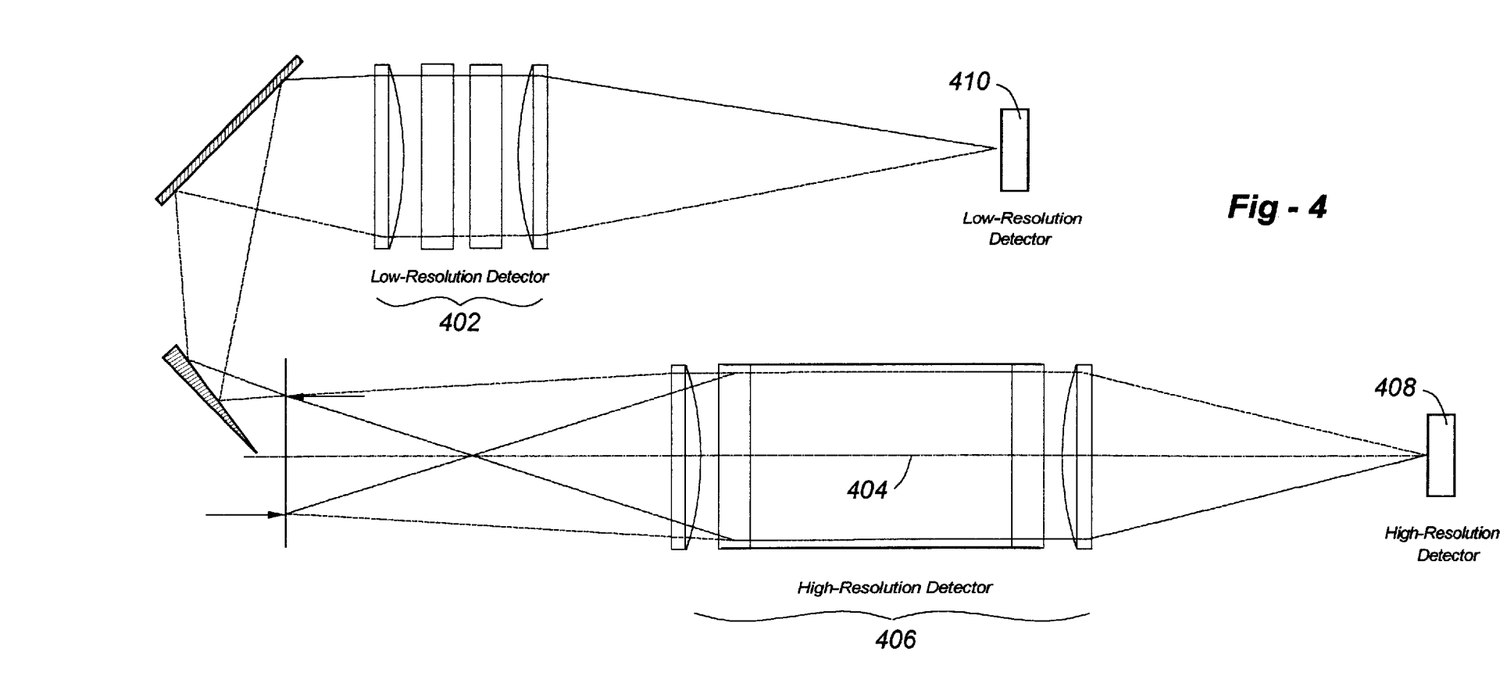
FIG. 4 is an alternative embodiment of the invention wherein light reflected by a high-resolution etalon is coupled to a lower-resolution etalon.

Many combinations like those just described are possible where the two ring patterns can be interpreted with prior knowledge about the interrelationships between the coupled interferometers. An example of such a coupled set of interferometers is illustrated in FIG. 4. This arrangement is similar to that depicted in FIG. 3, except that a second etalon 402 is used outside of the primary optical path 404. For example, a high-resolution etalon 406 may be used in conjunction with a high resolution detector 408, whereas the low resolution etalon 402 may be used in conjunction with a lower resolution detector 410, as shown. Note that the coupling between interferometers can also be accomplished using fiber optics as will be discussed in the following section.

RECYCLED REFLECTED LIGHT

There are several disadvantages to the first scheme discussed above. First, only a gain of two is possible when the amount of reflected light can be more than an order of magnitude greater than that transmitted. Secondly, an additional detector is necessary to observe the reflected light, and that is an additional complication to the interferometric system. An alternative embodiment that is much more attractive would be to use all, or at least a significant fraction, of the reflected light by reflecting the light back into the primary etalon and ultimately to the same detector. Such an arrangement yields a small gain, since the original transmitted light has removed the energy from just the spectral region that would have been transmitted in the secondary reflected beam. The angular correlation between the two beams removes most of the advantage of recycling the light. However, if the recycled light is randomized in angle, then re-transmitting the light is very advantageous. A simple way to remove the correlation between the reflected light and the transmitted light, is to use a fiber optic to recycle the light into the etalon.

Figure 5:
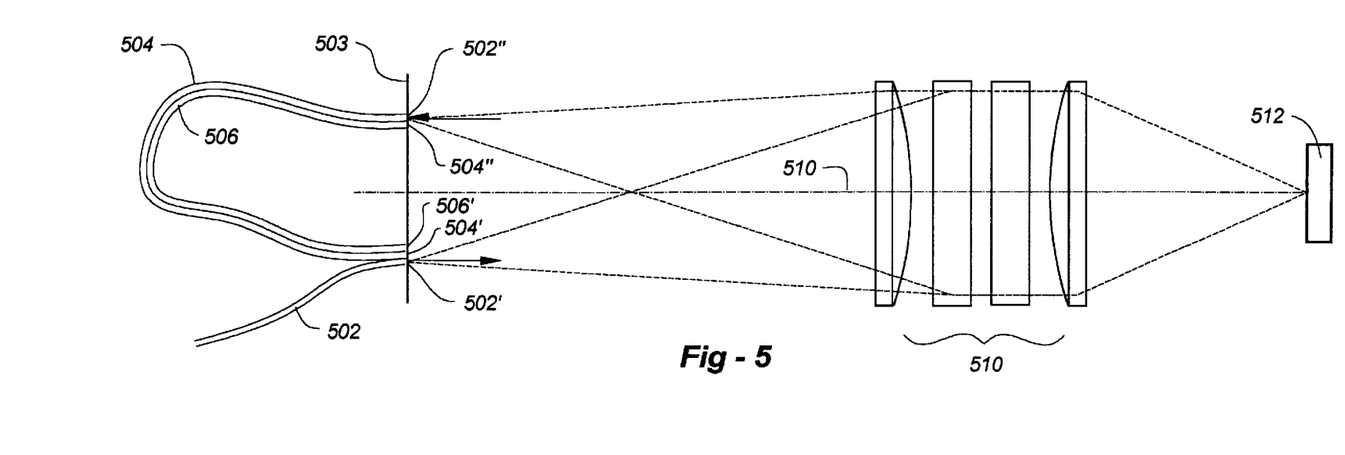
FIG. 5 is a drawing which shows how optical fibers may be used to recycle light in a Fabry-Perot etalon.

As shown in FIG. 5, the reflected light exits from the system as a complementary ring pattern on the other side of the optical axis in the infinity focus of the entrance collimator. Assuming that the primary source of light to the instrument is a single large fiber optic 502, to point 502 on the image plane, then the reflected light would be imaged where the surface of the source fiber is imaged, at point 502" on the opposite side of the optical axis 505. Inside of this image there would be a negative ring where the light is transmitted to the detector on the first pass.

According to this aspect of the invention an identical fiber 504 is positioned at this image and bend back to other end of the fiber to occupy a position 504' which is preferably adjacent to the primary fiber 502. The light, an integral of the reflected light, then passes through the instrument in exactly the same manner as the primary beam. This beam is also reflected next to the primary reflection at point 504" and may again be recycled using a second fiber 506 to point 506', and so on. This process may continue until most of the light is transmitted through the system onto the primary detector.

Figure 6:
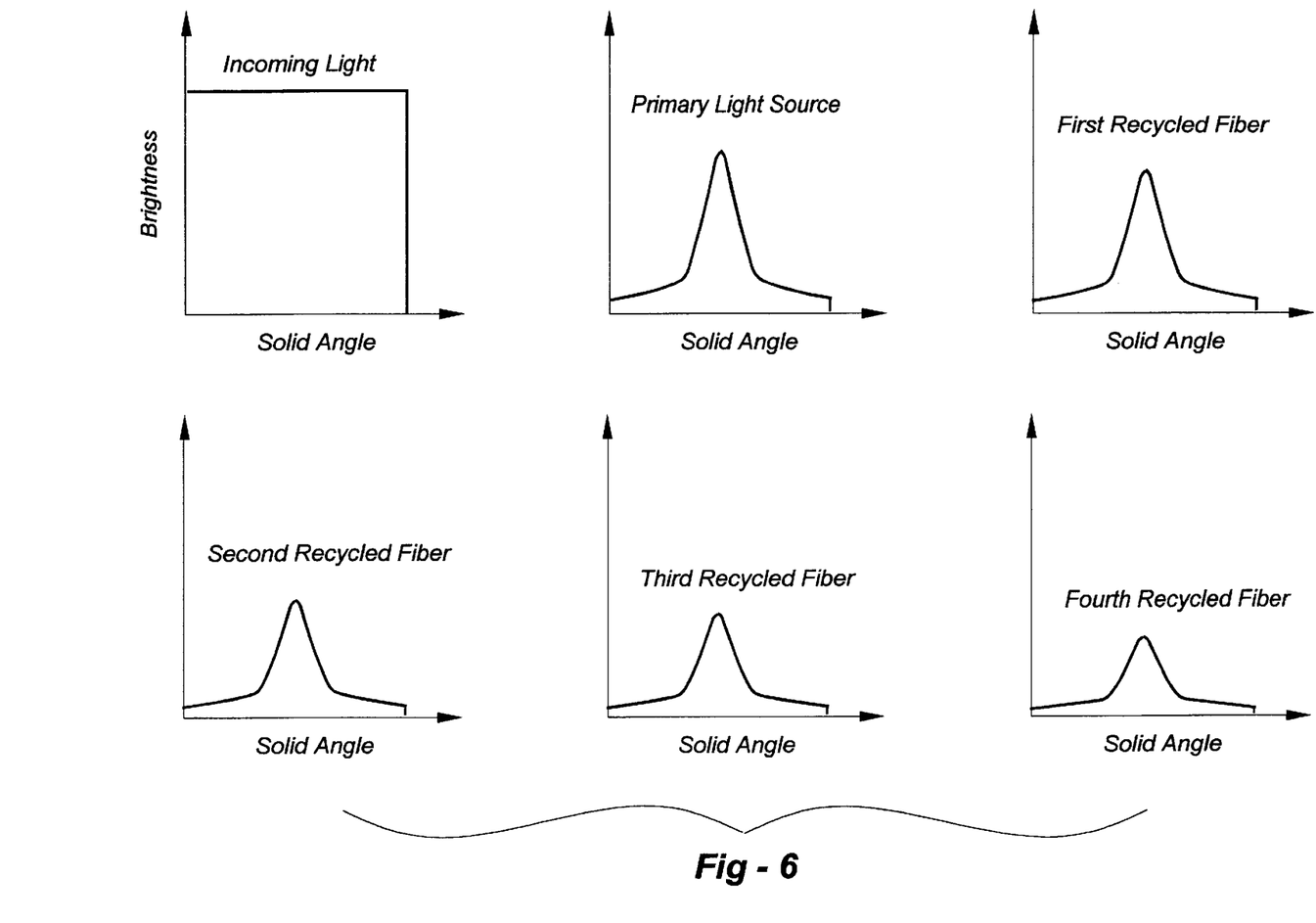
FIG. 6 is a group of graphs show a progression of fiber-recycled light according to the invention.

It should be noted that on each reflection, $2RT_F/(1+R)$ of the light passing through the fiber is recycled, where $T_F$ is the transmission of the fiber. Thus, the amount of light passing through the nth coupling fiber would then be $(2RT_F/(1+R))^n$. This arrangement is illustrated in the diagrams of FIG. 6.

The light being recycled on each reflection forms a geometric progression and the sum of all of the light being provided to the etalon after n fiber recycling is equal to:

$$T_n = \frac{1 - \left[\frac{2RT_F}{1+R}\right]^{n+1}}{1 - \left[\frac{2RT_F}{1+R}\right]}$$

which as n becomes large tends to $(1+R)/(1-R)$ meaning that all of the incoming light is transmitted to the detector. This is a substantial gain in signal from the initial amount of light that an ordinary Fabry-Perot interferometer will transmit.

It is also interesting to note that the gain in light for this system is accomplished by increasing the effective etendue of the system. In this case of increasing the angular field viewed by the etalon. This is expected, since more light must pass through unfilled portions of the $A\Omega$ space in the system. This means that this technique for increasing the throughput of a Fabry-Perot is best suited for situations where there is a finite amount of light available and that must be used most effectively.

Figure 7A:
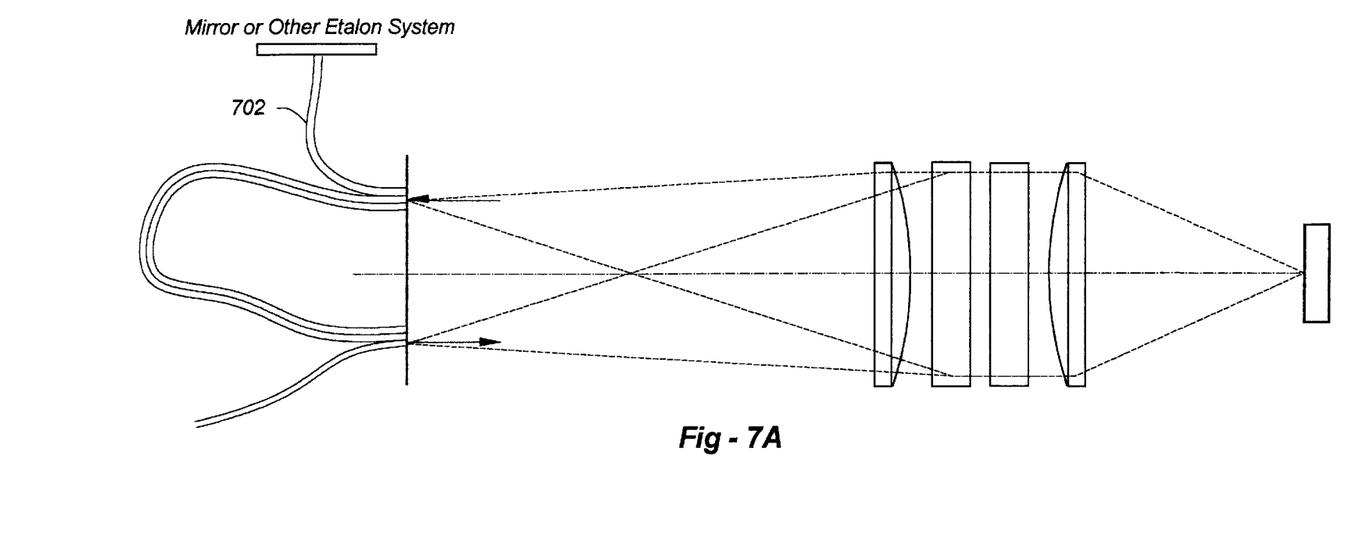
FIG. 7A is a drawing which shows how recycling fibers may be used in conjunction with a mirror to provide a back recycling function.
Figure 7B:
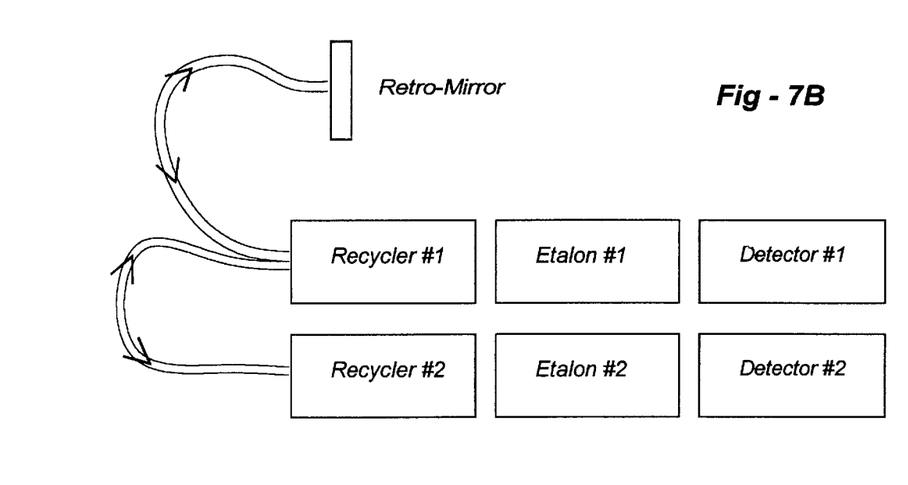
FIG. 7B is a drawing which shows how a plurality of interferometer systems may be used with a retro-reflecting mirror.

This effect is particularly significant when the etendue of the instrument is limited by telescope size, solid angle, or etalon size. Such a situation provided by a space flight instrument as one important application, and another is the use for a lidar system, where both the telescope size and the field of view are limited. As shown in FIG. 7A, the light from this type of recycling can be recycled back through the same set of fibers by adding a mirrored fiber to the final fiber 702 rather than recycling it back through the system directly. It should be noted that the mirror shown in FIG. 7A can be another interferometer system which is recycled as previously described. Thus light may be cycled through a number of etalon systems with differing spectral resolution finally being returned through the entire system with a retro-reflecting mirror. This is illustrated symbolically in FIG. 7B.

Figure 8:
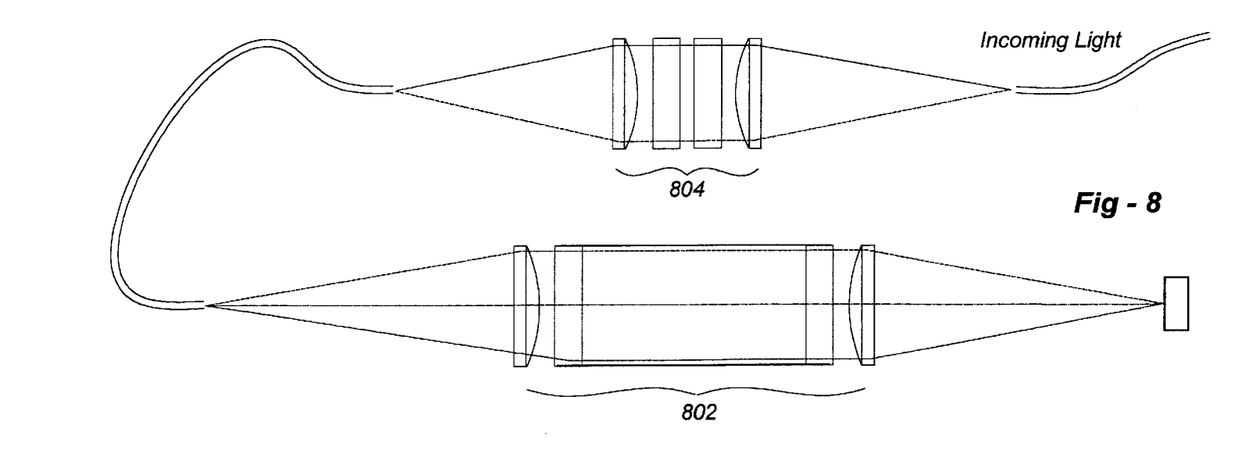
FIG. 8 illustrates how etalons of different resolutions may be ganged together to form a multi-etalon interferometer using optical fibers or other light-carrying conduits.

It is very desirable to use fiber optics in the process of coupling multiple interferometers to avoid the correlation of the two ring patterns created by the two or more interferometers that are being coupled. For instance, in most interferometers it is desirable to have a very low resolution filter element present to preselect a narrow spectral region that can be examined by the higher resolution elements. This filter elements is then followed by one or more higher resolution elements that examine the spectrum is greater detail. In the previous designs of multi-etalon interferometers the inner etalon reflection problem has been a complication that is difficult to address. In the past, a lossy element has been placed between the etalons to avoid the inter-etalon reflection of light. However, in many applications the various etalons can be coupled using fiber optics in a very modular and convenient manner, eliminating the problem with inter etalon reflection. This concept is illustrated in the schematic diagram of FIG. 8. Here, only two etalons are coupled, including a higher resolution device 802 and a lower-resolution device 804. However, the concept can be extended to any number of etalons or filtering elements in a multi-etalon interferometer.

I claim:

1. A method of enhancing the utility of a Fabry-Perot interferometer having an image plane and optical detector disposed along an optical axis, the method comprising the steps of:

providing an etalon having two partially reflecting parallel mirrors;

introducing light to be characterized at a first off-axis point on the image plane and into the etalon such that the light is partially transmitted to the detector and partially reflected to a second off-axis point on the image plane; and detecting at least a portion of the light reflected at the second off-axis point.

2. The method of claim 1, wherein the step of detecting at least a portion of the light at the second off-axis point further includes the step of:

guiding the light to a third off-axis point on the image plane for retransmission back through the etalon to the detector.

3. The method of claim 2, further including the step of:

randomizing the angular coherence of the light prior to reaching the third off-axis point.

4. The method of claim 3, further including the step of:

directing the light through an optical fiber to randomize the angular coherence of the light.

5. The method of claim 1, wherein the step of detecting at least a portion of the light at the second off-axis point further includes the step of:

reflecting the light back through the etalon to the detector.

6. The method of claim 5, further including the step of:

randomizing the angular coherence of the light prior to reaching the third off-axis point.

7. The method of claim 6, further including the step of:

directing the light through an optical fiber to randomize the angular coherence of the light.

8. The method of claim 1, wherein the step of detecting at least a portion of the light at the second off-axis point further includes the step of:

routing the light to a second detector.

9. The method of claim 8, further including the step of:

randomizing the angular coherence of the light prior to reaching the second detector.

10. The method of claim 9, further including the step of:

directing the light through an optical fiber to randomize the angular coherence of the light.

11. A method of enhancing the efficiency of a Fabry-Perot interferometer having an image plane and an optical detector disposed along an optical axis, the method comprising the steps of:

a) providing an etalon having two partially reflecting parallel mirrors;

b) introducing light to be characterized at a first off-axis point on the image plane and into the etalon, such that a portion of the light is transmitted to the detector and a portion of the light is reflected to a different off-axis point on the image plane;

c) routing the reflected light back through the etalon, such that a portion of the light is transmitted to the detector and a portion of the light is reflected to yet a further off-axis point on the image plane; and d) repeating step c) until a desired level of efficiency enhancement is achieved.

12. The method of claim 11, further including the step of:

randomizing the angular coherence of the light prior to routing the reflected light back through the interferometer.

13. The method of claim 12, further including the step of directing the light through an optical fiber to randomize the angular coherence of the light.

14. Interferometer apparatus, comprising:

a Fabry-Perot etalon disposed along an optical axis between an image plane and an optical detector, the etalon including two partially reflecting parallel mirrors;

a source of light directed to the detector through the etalon from a first off-axis point of the image plane; and means for detecting light reflected by the etalon at a second off-axis point of the image plane.

15. The apparatus of claim 14, wherein the means for detecting light reflected by the etalon at a second off-axis point of the image plane further includes:

an optical fiber having one end supported at the second off-axis point of the image plane and the other end supported at a third off-axis point of the image plane, the fiber being operative to re-direct the reflected light back through the etalon to the detector.

16. The interferometer of claim 15, wherein the optical fiber is a multi-mode fiber.

17. The interferometer of claim 15, including a plurality of optical fibers, each having one end to receive light at an off-axis point of the image plane, and another end to re-direct the light back through the etalon from a different off-axis point of the image plane.

18. The apparatus of claim 14, wherein the means for detecting light reflected by the etalon at a second off-axis point of the image plane further includes:

an optical fiber having one end supported at the second off-axis point of the image plane and the other end delivering the light to a second detector.

19. The apparatus of claim 14, wherein the means for detecting light reflected by the etalon at a second off-axis point of the image plane further includes:

an optical fiber having one end supported at the second off-axis point of the image plane; and a mirror supported at the other end of the fiber, the mirror and fiber being operative to re-direct the reflected light back through the etalon to the detector.

20. An enhanced sensitivity interferometer, comprising:

a Fabry-Perot etalon disposed along an optical axis between an image plane and a detector, the etalon including two partially reflecting parallel mirrors;

a source of light following a first optical path to a first region of the image plane, such that a first portion of the light travels through the etalon and impinges on a first area of the detector, and a second portion of the light is reflected to a second region of the image plane; and an optical element operative to guide the reflected light along a second optical path to a second area of a detector.

21. The interferometer of claim 20, wherein the first and second areas form part of the same detector.

22. The interferometer of claim 20, wherein the optical element is an optical fiber operative to guide the reflected light to a third region of the image plane for re-transmission back through the etalon.

23. The interferometer of claim 22, wherein the optical fiber is operative to randomize angular coherence.

24. The interferometer of claim 22, wherein the first and third regions are adjacent to one another at the image plane.

25. The interferometer of claim 22, further including a mirror to reflect the light at the third region back through the etalon and onto the first area of the detector.

26. The interferometer of claim 25, further including an optical fiber to carry the light to and from the mirror.

27. The interferometer of claim 20, further including an optical fiber to carry the light along the first optical path.

28. The interferometer of claim 20, further including a second etalon disposed in the second optical path.

29. The interferometer of claim 20, further including an optical fiber to carry the light along the second optical path.

30. The interferometer of claim 20, wherein:

the second area forms part of a second detector; and an optical fiber is used to carry the reflected light to the second detector.

* * * * *